May 23, 1939.    J. E. BEVINS    2,159,125
TACHOMETER
Filed Oct. 30, 1936    2 Sheets-Sheet 2

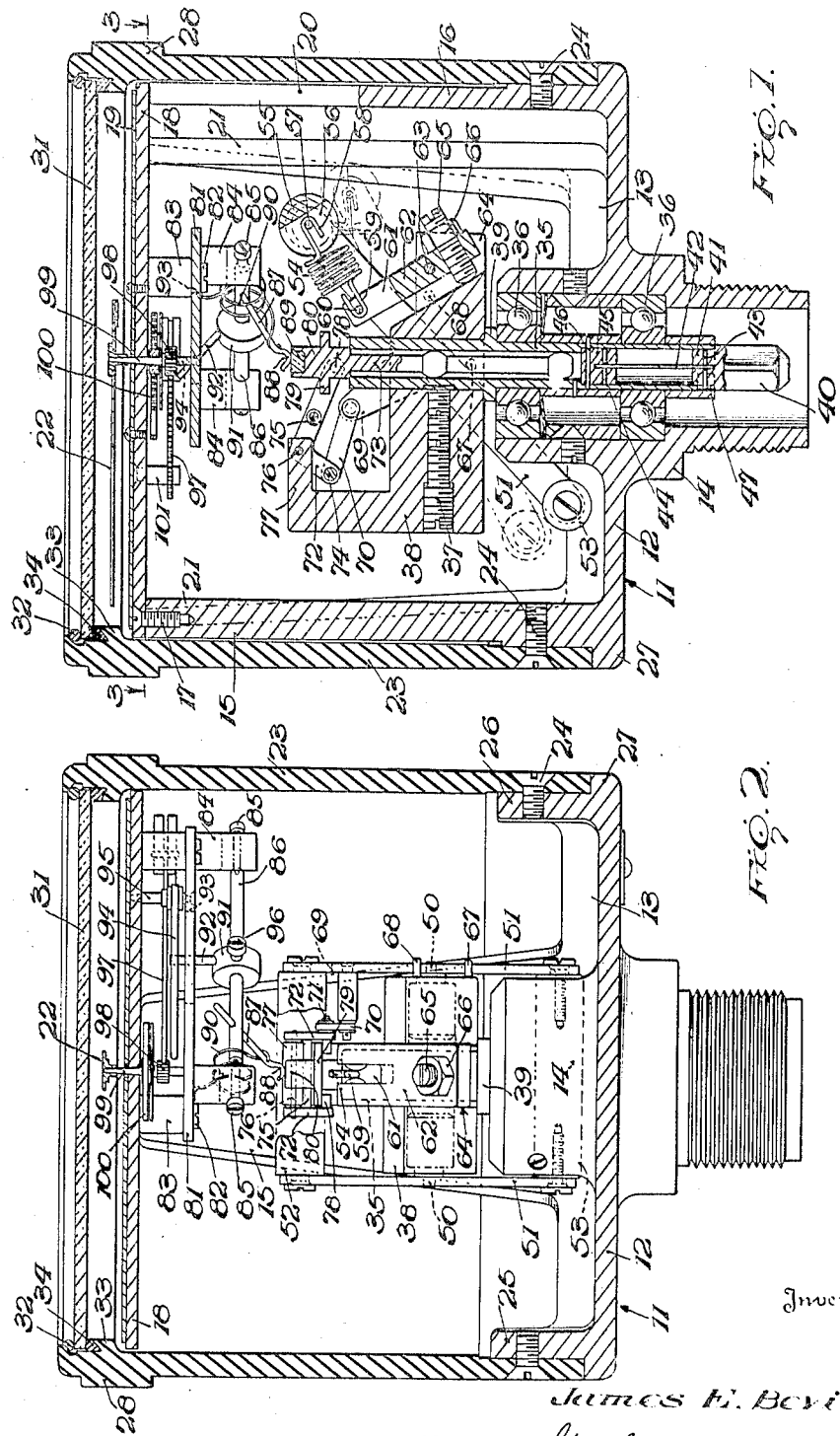

Inventor
James E. Bevins.
By Stephen Cerstvik
Attorney

Patented May 23, 1939

2,159,125

UNITED STATES PATENT OFFICE 2,159,125

TACHOMETER

James E. Bevins, Bronx, N. Y., assignor to Bendix Aviation Corporation, South Bend, Ind., a corporation of Delaware Application October 30, 1936, Serial No. 108,499

11 Claims. (Cl. 264—20)

This invention relates to tachometers, and more particularly to mechanical tachometers of the centrifugal type in which springs are utilized for governing the movements of the centrifugally actuated members.

One of the objects of the invention is to provide a centrifugal tachometer of improved construction in which the indicating dial may be uniformly graduated over its entire range.

Another object is to provide a tachometer which may be driven directly from the cam shaft of an engine or other rotating member the speed of which is to be measured, without the use of intermediate gearing, thereby reducing the number of bearings and shafts and enabling substantially noiseless operation at a much lower speed than similar gear driven devices.

A further object is to provide a tachometer in which a novel arrangement of governing spring and centrifugally actuated member avoids the necessity for employing sliding elements in the indicator actuating mechanism in order to permit the use of a uniformly graduated indicator dial.

Still another object is to provide a simple and novel range adjustment for the indicating mechanism of a tachometer.

A still further object is to provide a tachometer of the centrifugal type with improved means for adjusting the initial tension of the spring and for effecting the low speed calibration of the indicator.

Another object is to provide a tachometer in which the entire mechanism, including the indicator dial and pointer, is removable as a unit from the rear of the casing.

Another object is to provide a tachometer of the character described in which novel means are utilized for reducing to a minimum oscillation of the indicating pointer, particularly at times when abrupt changes take place in the speed being measured.

These and other objects of the invention will appear more fully upon consideration of the detailed description of the embodiment of the invention which follows. Although only one specific form of tachometer has been described and illustrated in the accompanying drawings, it is to be expressly understood that these drawings are for purposes of illustration only and are not to be construed as a definition of the limits of the invention, reference being had for this latter purpose to the appended claims.

In the drawings, wherein like reference characters indicate like parts throughout the several views:

Fig. 1 is a sectional elevation, taken substantially on line 1—1 of Fig. 3, of one form of tachometer embodying the present invention with the elements thereof shown in their at rest positions;

Fig. 2 is a sectional elevation of the embodiment of Fig. 1 taken substantially on the line 2—2 of Fig. 3 and rotated 90 degrees with certain elements partially cut away in order to better illustrate the details of the plunger head and motion transmitting link and lever members;

Figure 3:
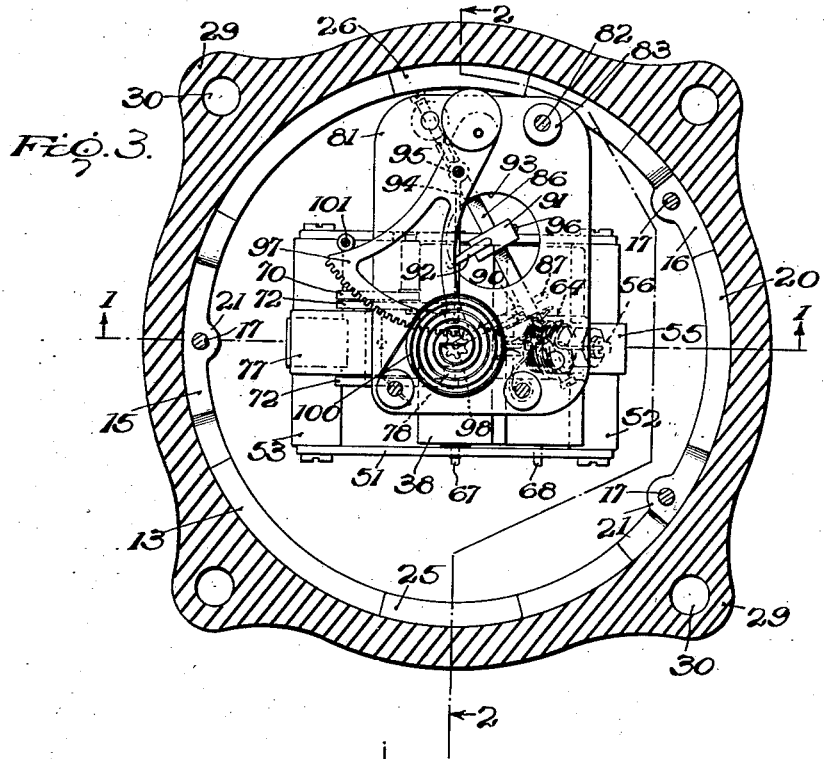
Figure 4:
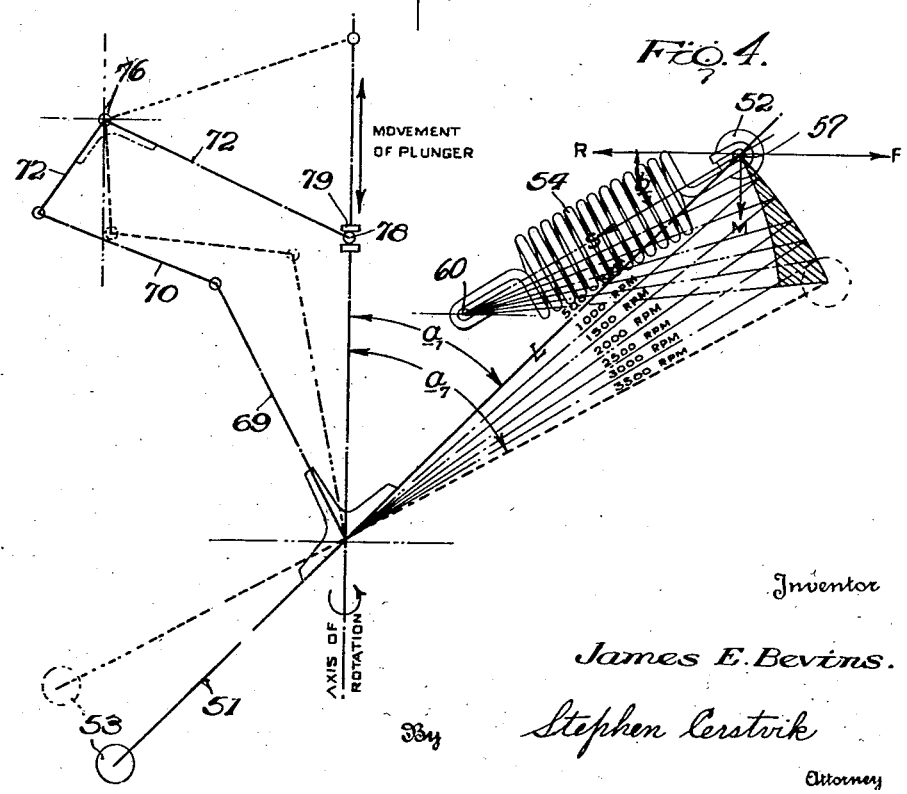

Fig. 3 is a sectional plan view of the tachometer of Figs. 1 and 2 taken substantially on line 3—3 of Fig. 1; and Fig. 4 is a diagrammatic showing of the mechanism of Figs. 1, 2 and 3 illustrating the relative angular positions of the link and lever members and governor spring with respect to the centrifugally actuated weighted element for the minimum and maximum speed positions of the latter, and graphically indicating the loading of the spring for various positions of said weighted element corresponding to uniform variations in the speed being measured.

The tachometer of the present invention is basically a centrifugal governor of the inclined weight type wherein the weighted element is normally held at an acute angle to the drive shaft by the governor spring but, under the action of centrifugal force, tends to assume a position at right angles to said shaft, equilibrium for every rotative speed being established by a balance between the centrifugal force and the restraining force of the spring. Each change in the angular position of the weighted element is transmitted through a linkage system to a pointer which is in registry with an indicating dial calibrated to read in R. P. M. of the engine shaft or other element the speed of which is to be measured. Inasmuch as centrifugal force, the actuating force in tachometers of this type, varies as the square of the angular velocity or R. P. M., an unmodified translation of the movements of the weighted element into movements of the indicating pointer would necessitate the use of a non-uniformly graduated dial in order to give a proper reading of the speed being measured. To avoid this, it has hitherto been customary to use a variable leverage system wherein one element slides with respect to another so as to convert the non-uniform movements of the centrifugally actuated member into uniform movements of the pointer. Such a sliding lever system is, however, the greatest source of inaccuracy, friction and wear in a tachometer, and it is to the elimination of this source of error and wear that the present invention is primarily directed.

In the structure herein disclosed, the desired uniform travel of the pointer for uniform variations in speed is accomplished by so positioning the governor spring that the component of its restraining force acting perpendicularly to the axis of rotation of the weighted element always just balances the centrifugal force exerted by the weighted element when the latter moves through uniform angular distances with uniform changes in rotational speed. In other words, starting with the premise that the angularity of the weighted element relatively to the axis of rotation must change uniformly with uniform speed changes, the governor spring is so positioned and of such length that its effective resistance to outward movement of the weighted element under the influence of centrifugal force varies as a function of the square of the rotational velocity.

As shown in Figs. 1, 2 and 3, one form of tachometer embodying the invention comprises a supporting member indicated generally at 11 having an annular base 12, a relatively short, upstanding, cylindrical flange 13 around the outside of said base, and a hollow bearing boss 14 positioned centrally of the base and extending both above and below the same. At two diametrically opposite points the flange 13 is provided with upwardly extending arms 15 and 16 which are adapted to support, and to have secured to their upper ends as by screws 17, a cover plate 18, the top surface of the latter having suitably secured thereto an indicating dial 19 uniformly calibrated in terms of R. P. M. of the engine shaft or other rotatable element the speed of which is to be measured. Each of arms 15 and 16 is of substantial width peripherally of flange 13, is in prolongation of the latter, and is slightly tapered at the sides toward its upper end, the arm 16 being of greater peripheral extent than arm 15 and being cut away at its upper central portion as indicated at 20 so as to facilitate access to the elements of the operating mechanism all of which are adapted to be mounted in assembled relationship on supporting member 11. At the point where the cover plate screws 17 are threaded into arms 15 and 16, the latter may be provided with cylindrical enlargements 21 on their inner surfaces.

The supporting member 11 and all of the operating elements of the tachometer mechanism mounted thereon, including cover plate 18, dial 19 and its cooperating indicating pointer 22 the mounting of which will later be described, are adapted to be housed within and secured to a cylindrical casing 23, preferably formed of insulating material. The inner diameter of the lower end of casing 23 is such as to receive the flange 13 of supporting member 11 therewithin with a relatively close fit, the latter being secured in place within said casing by screws 24 threaded into the flange 13 or, as in the embodiment illustrated, into the lower portions of arms 15 and 16 and a pair of relatively short lugs 25 and 26 which extend upwardly from flange 13 at diametrically opposite points spaced approximately 90° from arms 15 and 16. In order to prevent the supporting member 11 and the mechanism mounted thereon from being forced too far into casing 23, base 12 of the supporting member may be provided with an outwardly extending fl...ge portion 27 adapted to abut the lower end of the casing.

To facilitate the mounting of the tachometer in an instrument board, casing 23 is preferably provided adjacent its upper end with a flange 28 having a plurality of ears 29 formed integrally therewith at circumferentially spaced points, each of which ears is provided with a hole 30 adapted to receive a bolt or other suitable securing means. The upper end of casing 23 is closed by a suitable cover glass 31 which is held in place as by a snap ring 32 upon a supporting collar 33 formed integrally with and projecting from the inner surface of casing 23. If desired, a gland or gasket 34 of rubber or like material may be interposed between cover glass 31 and supporting collar 33 in order to more tightly seal this end of the casing.

The operating mechanism of the tachometer comprises in general a driving shaft, a weighted element carried by said shaft for rotation therewith but pivotally mounted with respect thereto so that its angular position may vary in response to centrifugal force, a governor spring for resisting the effect of centrifugal force on the weighted element, a plunger adapted for reciprocatory movement, a system of links and levers for converting angular displacement of the weighted element into straight line motion of the plunger, and a mechanism for converting this motion of the plunger into rotational movement of the indicating pointer. As illustrated, the driving shaft comprises a hollow spindle 35 the lower portion of which is rotatably mounted in suitable bearings 36 housed within bearing boss 14 of the supporting member 11, while the upper end thereof extends above the top of boss 14 and has fixedly secured thereto by an arrangement of set screws 37 a relatively massive supporting block 38 on which are mounted the elements of the centrifugally actuated mechanism. A collar 39 formed integrally with the spindle 35 maintains the latter in its proper vertical position relatively to the bearings 36 and also engages the bottom of block 38, thereby establishing the vertical position thereof. The lower end of driving spindle 35 is provided with a squared end piece or coupling member 40 which is adapted to be connected to a flexible shaft or other element serving to drive the tachometer directly from the engine cam shaft or other rotatable member the speed of which is to be measured.

In order to minimize pointer oscillation which commonly occurs in tachometers driven by flexible shafts, the present invention includes a novel torsion shock absorbing device interposed between the driving spindle 35 and the connection to the flexible driving shaft. As shown in Fig. 1, the squared end piece 40 is formed separately from driving spindle 35 and is provided with a cylindrical portion 41 of reduced diameter adapted to extend into the lower end of said spindle and to receive in a diametrical slot formed therein the lower end of a flat torsion spring 42, the said spring being connected to the end piece 40 by means of a pin 43. The upper end of spring 42 is fixed by a similar pin 44 to a cylindrical plug 45 which is housed within the bore of driving spindle 35 and fixed thereto by still another pin 46. One end of pin 43 projects outwardly beyond the surface of cylindrical portion 41 of squared end piece 40 into a notch 47 which is cut into the lower end of spindle 35. In the embodiment illustrated, the notch 47 has a peripheral extent of approximately 120° so as to permit relative rotational movement to this extent only, between squared end piece 40 and driving spindle 35. When the spring 42 is in untwisted condition, the pin 43 is positioned in the center of notch 47, thereby enabling the spring to absorb torsional loads equivalent to a 60° rotation of end piece 40 in either direction before the pin 43 abuts one end or the other of notch 47 and establishes a direct, positive drive from the end piece 40 to the driving spindle 35. The inertia of the mass of supporting block 38 also assists in minimizing pointer oscillation by tending to smooth out the variations in rotational speed of the driving spindle.

Referring now to the centrifugally actuated mechanism mounted on supporting block 38, the latter is provided with a pair of pivot members 50 see Fig. 2 arranged on opposite sides of the driving spindle 35 with the pivotal axis thereof at right angles to and passing through the axis of rotation of the spindle. These pivot members 50 constitute the mounting for the centrifugally actuated, weighted element of the tachometer which, in the embodiment illustrated, consists of a substantially rectangular frame formed by a pair of parallel, elongated side members 51 pivotally mounted at their center points on pivot members 50 and a pair of cylindrical weighted members 52 and 53 connecting the adjacent ends of said side members. When the tachometer is at rest, the weighted frame lies in such position that its plane makes an angle of approximately 45° with the axis of rotation of driving spindle 35, being held in this position by a suitable governor spring, such as a longitudinally coiled spring 54, the outer end of which is connected to the upper weighted member 52 while its inner end is anchored in a fixed position relatively to supporting block 38 in the acute angle between the plane of the weighted frame and the spindle 35. To facilitate the connection of the spring thereto, upper weighted member 52 is provided with a central portion 55 of slightly enlarged diameter in which is cut a transverse slot 56 of greater depth than the radius thereof, said slot being spanned by a pin 57 coaxial with member 52 about which the hooked outer end 58 of the spring 54 is adapted to pass. The hooked inner end 59 of the spring smilarly engages a pin 60 housed in a vertically extending recess 61 formed in the upper end of a spring mounting bracket 62 which is pivotally mounted at 63 in a recess 64 formed in supporting block 38. The lower end of bracket 62 is provided with a set screw 65 bearing against the inner wall of recess 64 and a lock nut 66 by which the angular position of said bracket may be varied about its pivot 63 so as to adjust the tension of governor spring 54.

It will be noted that, in the at rest position of the weighted element, the axis of governor spring 54 forms an acute angle with the plane of said element so that there is a small spring tension effective to hold the element in said position until the driving spindle has attained the minimum speed which it is desired to indicate. This initial tension may be adjusted as desired by set screw 65. In order to positively establish the at rest position of the weighted element, supporting block 38 is provided with a horizontal, outwardly extending stop pin 67 against which one of side members 51 abuts at a position slightly below its pivot point. A similar stop pin 68 is also provided for positively limiting movement of the weighted element in response to centrifugal force, this latter pin being so positioned in the embodiment illustrated as to prevent the weighted frame from moving through an angle toward the horizontal of more than about 16° from its at rest position. The hook and pin connections of the ends of the governor spring 54 to weighted member 52 and spring mounting bracket 62 permit a rolling action of the spring such that it always exerts a straight line pull between its points of connection without distortion.

Angular movement of the weighted frame about its pivots 50 is converted with suitable amplification into rotational movement of indicating pointer 22 through a novel arrangement of elements, including a leverage system of invariable ratio and a vertically movable plunger. As shown, one of side members 51 of the weighted frame is provided with an integrally formed arm 69 see Fig. 1 which extends upwardly from said member in the same vertical plane therewith, connecting to said member adjacent the pivot point thereof and forming a fixed angle with the plane of the weighted frame of slightly less than 90°. The upper end of arm 69 is pivotally connected to one end of a link 70 the opposite end of which is pivotally mounted on a suitable pin 71 which extends laterally outwardly from the lower end of one of a pair of bell crank levers 72 forming the sides of a rocker frame adapted to produce vertical, straight line movement of a plunger 73 the lower portion of which is slidably housed within hollow driving spindle 35. The two bell crank levers 72 are rigidly connected together to complete the rocker frame by cross pieces 74 and 75 see Fig. 1, and are pivotally mounted at 76 on the end of a supporting bracket 77 of inverted L-shape extending upwardly and inwardly toward the axis of rotation from the center portion of the outer edge of the more massive side of supporting block 38 diametrically opposite recess 64 in which spring mounting bracket 62 is housed. The ends of the other arms of bell crank levers 72 opposite to those connected by cross piece 74 are provided with inwardly extending cylindrical lugs or posts 78 which engage beneath a collar 79 formed integrally with the head 80 of plunger 73. The plunger head 80 is of greater diameter than the bore of driving spindle 35 and in normal at rest position rests on the upper end of the latter. As the weighted frame moves outwardly under the influence of centrifugal force, the plunger 73 is raised through the linkage system comprising arm 69, link 70 and bell crank levers 72, the straight line movement of the plunger being substantially directly proportional to the angular movements of the weighted frame because of the sliding relationship between lugs 78 and the collar 79 resting thereon.

The vertical movements of plunger 73 are converted into rotation of indicating pointer 22 through a rocking shaft and rack and pinion mechanism supported by a plate 81 which is in turn secured to the underside of cover plate 18 as by screws 82 surrounded by spacer sleeves 83. As shown, the plate 81 has suitably fixed thereto a pair of downwardly extending bearing posts 84 through which pass horizontal, axially aligned screws 85 the inner ends of which are coned and extend into complementary bearing recesses formed in the ends of a rocking shaft 86 so as to form bearings for the latter. Secured to the shaft 86 and extending downwardly therefrom is a finger 87 the lower end of which is curved as indicated at 88 to form a follower resting on a flat jewel bearing 89 mounted in the upper end of plunger head 80. By making finger 87 of some such material as chromium plated music wire and using a jewel bearing 89, frictionless contact between the finger and plunger head 80 may be assured. In order to maintain the follower end of finger 87 in contact with the bearing 89 and to continually urge the plunger 73 downwardly toward its at rest position, a suitable coiled spring 90 may be provided encircling rocking shaft 86 with one end anchored beneath one of the screws 82 which support plate 81 and its other end hooked over finger 87 in such a way as to continually urge the latter downwardly.

There is also adjustably secured to rocking shaft 86 a collar 91 having fixed thereto an upwardly extending finger 92 which projects through an opening 93 formed in plate 81 and contacts at its upper end with a horizontally extending arm 94 as seen in Fig. 2 secured to a spindle 95 suitably supported between plate 81 and cover plate 18 for oscillation about a vertical axis. As shown best in Fig. 3, rocking shaft 86 and arm 94 lie in different vertical as well as horizontal planes, with their horizontal projections intersecting at an acute angle. By means of a set screw 96, the collar 91 may be adjusted in its position on rocking shaft 86 and thereby vary the point on arm 94 at which the finger 92 makes contact.

Also secured to spindle 95 in a plane slightly above arm 94 as seen in Fig. 2 is a horizontally extending toothed sector or rack member 97 the outer toothed periphery of which meshes with a pinion 98 secured to a vertical spindle 99 suitably journalled in plate 81 and cover plate 18. The upper end of spindle 99 extends through cover plate 18 and dial 19 and has secured to its upper end the indicating pointer 22. The spindle 99 is continually urged in a counterclockwise direction as viewed in Fig. 3 so as to return the pointer to its zero or low speed position by a suitable coil spring 100 secured at its inner end to said spindle and anchored at its outer end to a fixed portion of the assembly, as to one of sleeves 83. A stop 101 secured to and extending downwardly from cover plate 18 may be provided to limit clockwise movement of rack 97 about the axis of its spindle 95 due to the effect of spring 100 and thereby prevent disengagement between said rack and the pinion 98.

As heretofore indicated, the dial 19 is uniformly graduated in terms of the R. P. M. of the engine cam shaft or other rotating element the speed of which is to be measured, the calibration usually starting not at zero but at some figure, such as 500 R. P. M., which represents the minimum speed which it is desired to indicate. As previously explained, the initial tension and position of the governor spring 54 are such as to prevent movement of the weighted frame from its at rest position until the speed of rotation exceeds this minimum. The indicating range of the tachometer may be adjusted in a novel and simple manner by simply varying the position of collar 91 and its finger 92 relatively to rocking shaft 86.

In order that the pointer 22 may move through equal angular distances when equal variations occur in the speed of rotation of the driving spindle 35 without requiring a sliding leverage system, the pin 60 by which the inner end of governor spring 54 is anchored is so located relatively to the weighted frame and other elements of the mechanism that the effective resistance of the spring to movement of the frame under the influence of centrifugal force varies in such a way that, as the frame moves through uniform angular distances, it is always approximately equal to the centrifugal force which would be developed if the speed of rotation also varied uniformly with uniform changes in the position of the weighted frame. While various methods may be utilized for determining the position and length of spring required to attain this result, the following procedure has been found quite satisfactory from a practical standpoint.

In the first place, it will be obvious from a consideration of Figs. 1, 2 and 3 that certain factors must be arbitrarily selected in order that the size of the instrument may be maintained within suitable limits. For example, the size and weight of side members 51 and weighted members 52 and 53 of the centrifugally actuated frame and the maximum angle through which the frame may move are first determined upon practical space and weight considerations; the initial or at rest angularity of the weighted frame is likewise arbitrarily selected. Referring now to the diagram of Fig. 4, this arbitrary selection establishes the mass $M$ of the weighted frame, which may be considered to be concentrated at the pin 57 to which the outer end of spring 54 is connected, the length $L$ of the arm represented by the distance between the axis of pivot members 50 and that of weighted member 52, the angle $a_1$ between the plane of the weighted frame in its initial position and the axis of rotation, and the angle $a_7$ representing the maximum inclination which the weighted frame is to be permitted corresponding to the maximum speed to be measured. Also diagrammatically illustrated in Fig. 4 are the initial and final positions of arm 69, link 70 and bell crank levers 72 corresponding to the minimum and maximum angularities of the weighted frame.

The position to be established for pin 60 is dictated to some extent by structural considerations, and in practice a point for this pin is first arbitrarily selected and then corrected in view of calculations made upon the basis of the selected position; as previously indicated, this arbitrarily selected point for pin 60 is so chosen that, even when the mechanism is at rest, the axis of the spring makes a slight angle with the plane of the weighted element so that there is an effective pull of the spring tending to hold the frame toward the axis of rotation. The angle $(a_7-a_1)$ through which the weighted frame moves in going from the minimum to the maximum speed position is then divided into any suitable number of equal parts and the positions of the frame at each increment of movement are designated to correspond with proportionate variations in the speed of rotation. For example, if the minimum speed to be measured on the tachometer is 500 R. P. M. and the maximum is 3500 R. P. M., the arcuate movement of the weighted frame may be conveniently divided into six equal parts each corresponding to an increase in speed of 500 R. P. M.

The centrifugal force $F$ generated at each of these speeds is then computed by means of the formula $$F = ML \sin a \left(\frac{\pi N}{30}\right)^2$$

where $N$ is equal to the R. P. M. of driving spindle 35. The strength $S$ of the spring required is next computed by graphically determining the amount of deflection of the spring between its minimum and maximum speed position and dividing this deflection into the difference between the amounts of centrifugal force created at maximum and minimum speeds. The effective resistance R of the spring to outward movement of the frame is then computed for each of the designated positions of the weighted frame using the formula $R = SD \cos b$ where S represents the strength of the spring, $b$ the angle between the axis of the spring and a perpendicular to the axis of rotation from the position of pin 57, and D the deflection of the spring at the angle $b$ derived by graphic measurement. If the proper point was originally chosen for the location of pin 60, the effective spring resistance R will in each case equal the centrifugal force F. If these computed figures are not equal, the location of pin 60 must be changed until the correct position is found, at which time there will result uniform angular movement of the weighted frame for uniform variations in the speed of rotation of the driving spindle, brought about by a nonuniform variation in the loading of the spring as represented by the crescent-shaped shaded area in Fig. 4.

Although the operation of the tachometer of the present invention should be apparent from the foregoing description, it may be summarized as follows. The driving spindle 35 is rotated directly from the engine cam shaft or other rotating element without the intervention of gearing through a flexible shaft connected to the squared end piece 40, the driving torque passing through spring 42 so as to permit absorption of torsional shocks that would otherwise result in undesired oscillation of the indicating pointer 22. As driving spindle 35 is rotated it carries with it supporting block 38 and the weighted frame, governor spring and linkage system mounted thereon. Until the speed of rotation of driving spindle 35 exceeds the minimum speed which the tachometer is intended to measure, the governor spring 54 maintains the weighted frame in its initial at-rest position with one of side members 51 in engagement with stop pin 67, and no movement of the linkage system takes place. As the speed of rotation increases, however, the weighted frame rotates about its pivots 50 under the influence of centrifugal force and against the resistance of spring 54, the position of the anchored end of said spring having been determined in the manner above pointed out so that its effective component perpendicular to the axis of rotation just balances the centrifugal force created when the frame moves through equal angles with equal variations in speed. The angular movements of the weighted frame are then transmitted, suitably multiplied if desired, by the linkage system consisting of arm 69, link 70 and bell crank levers 72 to the vertically movable plunger 73, the movements of the latter also being uniformly proportional to the variations in rotational velocity. Through the frictionless engagement between the curved end 88 of finger 87 and the jewel bearing 89 mounted in the upper end of plunger head 80, the straight line movements of the plunger are converted into rotational movements of rocking shaft 86 which in turn effects rotation of the spindle 99 on which pointer 22 is mounted through the finger 92, arm 94, toothed sector 97 and pinion 98.

There is thus provided by the present invention an improved form of centrifugal tachometer in which is embodied a novel arrangement of governor spring and centrifugally actuated element such that a uniformly graduated dial may be employed without the necessity for using a variable leverage system like those heretofore required. The instrument of the present invention also represents an improvement over centrifugal tachometers previously known inasmuch as it is directly driven from the engine cam shaft or other rotating element the speed of which is to be measured, and is so constructed that the entire operating mechanism may be removed from the instrument casing as a unit. Furthermore, pointer oscillation has been reduced to a minimum by the provision of a novel torsion spring drive interposed between the flexible driving shaft and the driving spindle of the instrument. These and other features, such as improved means for effecting the range adjustment of the indicating mechanism and for adjusting the initial tension of the governor spring, result in a tachometer which is a substantial practical improvement over those hitherto known to the art.

Although only one specific construction has been disclosed in detail, it will be obvious that the invention is not limited to the particular embodiment shown in the drawings, but is capable of a variety of mechanical embodiments. For example, the mechanism by which the straight line movements of the plunger are converted into rotation of the indicating pointer may be replaced by any other suitable transmission capable of attaining the same result. Likewise, it is contemplated that specifically different linkage systems may be substituted for that illustrated without affecting the underlying concept of the invention. Various other changes, which will now suggest themselves to those skilled in the art, may be made in the form, details of construction and arrangement of the parts without departing from the spirit of the invention. Reference is therefore to be had to the appended claims for a definition of the limits of the invention.

What is claimed is:

1. In a tachometer of the centrifugally actuated type, a rotatable driving member, a weighted element carried by a frame pivotally mounted on said driving member and movable relatively thereto about its pivot under the influence of centrifugal force, the axis of said frame normally making an acute angle with the axis of rotation of said driving member and a longitudinally coiled governor spring anchored at one end relatively to said driving member and connected at the other end to said weighted element, said spring being so arranged relatively to said weighted member that its anchorage point is within said acute angle and so that the effective component of its resisting force opposed to the centrifugal force exerted on said weighted element varies as a function of the square of the rotational speed of said driving member with equal variations in the angular position of said weighted element, whereby the latter moves through uniform angular distances with uniform variations in the rotational speed of said driving member.

2. In a tachometer of the centrifugally actuated type, a rotatable driving member, a weighted element pivotally mounted on said driving member at an acute angle to the axis of rotation thereof and movable relatively thereto about its pivot to vary said angle under the influence of centrifugal force, and a longitudinally coiled governor spring anchored at one end relatively to said driving member and connected at the other end to said weighted element, the point of anchorage of said spring being so located in the angle between said weighted element and the axis of rotation of said driving member that the effective component of its resisting force opposed to the centrifugal force exerted on said weighted element varies directly with the centrifugal force created when the angular position of said weighted element varies uniformly with uniform variations in the rotational speed of said driving member.

3. In a tachometer of the centrifugally actuated type, a rotatable driving member, a weighted element pivotally mounted on said driving member at an acute angle to the axis of rotation thereof and movable relatively thereto about its pivot to vary said angle under the influence of centrifugal force, a longitudinally coiled governor spring anchored at one end relatively to said driving member and connected at the other end to said weighted element, the point of anchorage of said spring being so located in the angle between said weighted element and the axis of rotation of said driving member that the effective component of its resisting force opposed to the centrifugal force exerted on said weighted element varies directly with the centrifugal force created when the angular position of said weighted element varies uniformly with uniform variations in the rotational speed of said driving member, an indicating element, and means for converting the movements of said weighted element about its pivotal axis into proportionate movements of said indicating element.

4. In a tachometer of the centrifugally actuated type, a rotatable driving member, a weighted element pivotally mounted on said driving member at an acute angle to the axis of rotation thereof and movable relatively thereto about its pivot to vary said angle under the influence of centrifugal force, a longitudinally coiled governor spring anchored at one end relatively to said driving member and connected at the other end to said weighted element, the point of anchorage of said spring being so located in the angle between said weighted element and the axis of rotation of said driving member that the effective component of its resisting force opposed to the centrifugal force exerted on said weighted element varies directly with the centrifugal force created when the angular position of said weighted element varies uniformly with uniform variations in the rotational speed of said driving member, an indicating element, and means for converting the movements of said weighted element about its pivotal axis into proportionate movements of said indicating element, said last-named means including means for adjusting the initial position of said indicating element independently of said weighted element.

5. In a tachometer of the centrifugally actuated type, a rotatable driving member, a weighted element pivotally mounted on said driving member at an acute angle to the axis of rotation thereof and movable relatively thereto about its pivot to vary said angle under the influence of centrifugal force, a longitudinally coiled governor spring anchored at one end relatively to said driving member and connected at the other end to said weighted element, the point of anchorage of said spring being so located in the angle between said weighted element and the axis of rotation of said driving member that the effective component of its resisting force opposed to the centrifugal force exerted on said weighted element varies directly with the centrifugal force created when the angular position of said weighted element varies uniformly with uniform variations in the rotational speed of said driving member, an indicating element, and means for converting the movements of said weighted element about its pivotal axis into proportionate movements of said indicating element, said last-named means including means for varying simultaneously both the initial position and range of movement of said indicating element independently of said weighted element.

6. In a tachometer of the centrifugally actuated type, a rotatable driving member, a weighted element pivotally mounted on said driving member and movable relatively thereto about its pivot under the influence of centrifugal force, a longitudinally coiled governor spring anchored at one end relatively to said driving member and connected at the other end to said weighted element, an indicating element, and means for converting the movements of said weighted element about its pivotal axis into proportionate movements of said indicating element including a rock shaft, means for rocking said shaft proportionately to the angular movements of said weighted element, a member drivingly connected with said indicating element and mounted for oscillation about an axis at right angles to the axis of said rock shaft, a finger carried by said rock shaft and contacting with said last-named member, and means for adjusting the position of said finger relatively to said rock shaft whereby the positions of said last-named member and indicating element may be varied independently of said weighted element.

7. In a tachometer of the centrifugally actuated type, a rotatable driving spindle, a supporting member mounted on said driving spindle for rotation therewith, a weighted member pivotally mounted on said supporting member on an axis at right angles to and passing through the axis of rotation of said spindle and adapted to move about said pivotal axis within an acute angle under the influence of centrifugal force, and a longitudinally coiled spring anchored at one end to said supporting member at a point within said acute angle and connected at its other end to said weighted member, said spring and weighted member being so arranged that the longitudinal axis of the spring makes an acute angle with said weighted member in all of the operative positions of the latter.

8. In a tachometer of the centrifugally actuated type a hollow, rotatable driving spindle, a supporting block mounted on said spindle, a plunger slidably housed within said spindle, a weighted element pivotally mounted on said block and movable about its pivot under the influence of centrifugal force, a longitudinally coiled spring connected at one end to said weighted element, an anchoring member to which the other end of said spring is connected, means for pivotally mounting said anchoring member on said block, means for adjusting said anchoring member about its pivot and fixing it in adjusted position whereby the tension of said spring may be varied, means for converting the pivotal movements of said weighted element into longitudinal movements of said plunger, an indicator, and means operatively connecting said plunger and indicator including a pivoted rack and a finger for moving said rack about its pivotal axis, said finger being adjustable with reference to said pivotal axis whereby the range of movement of said indicator may be varied independently of said weighted element.

9. In a tachometer of the centrifugally actuated type, a hollow, rotatable driving spindle, a plunger slidably housed within said spindle, a supporting block carried by said spindle, a weighted element pivotally mounted on said block and movable about its pivot under the influence of centrifugal force, a longitudinally coiled spring connecting said weighted element and said block, means including a linkage of invariable ratio operatively connecting said weighted element and plunger and adapted to convert the angular movements of the former into longitudinal movements of the latter, a rock shaft, means for converting the longitudinal movements of said plunger into rocking of said shaft, a finger slidably mounted on said shaft, a rack movable by said finger, and an indicating pointer rotatable by said rack.

10. In a tachometer of the centrifugally actuated type, a rotatable driving member, a weighted frame pivotally mounted on said driving member at an acute angle to the axis of rotation thereof and movable relatively thereto about its pivot to vary said angle under the influence of centrifugal force due to rotation, said frame comprising a pair of spaced parallel arms and a pair of weights respectively connected to the upper and lower ends of said arms, a longitudinally coiled governor spring located between said arms and anchored at one end relatively to said driving member and connected at the other end to one of said weights, the point of anchorage of said spring being so located in the angle between the weighted frame and the axis of rotation of the driving member that the effective component of the resisting force of the spring along its longitudinal axis in opposition to the centrifugal force exerted on the weighted frame varies directly with the centrifugal force created when the angular position of the weighted frame varies uniformly with uniform variations in the rotational speed of said driving member, a plunger movable along the axis of rotation of said driving member, means connected to said weighted frame and actuated thereby upon angular movement thereof for actuating said plunger, a rockshaft, means for actuating said rockshaft by the longitudinal movement of said plunger, indicating means, and transmission means connecting said rockshaft to said indicating means for actuating the latter.

11. In a tachometer of the centrifugally actuated type, a rotatable driving member, a weighted frame pivotally mounted on said driving member, said frame comprising a pair of spaced parallel arms and a pair of weights respectively connected to the ends of said arms, said arms forming an acute angle with said member and the pivotal axis of said frame being substantially mid-way of the length of said arms, a longitudinally coiled governor spring anchored at one end relatively to said driving member and connected at the other end to one of said weights, the point of anchorage of said spring being located within said acute angle and so that the effective component of the resisting force of said spring along its longitudinal axis in opposition to the centrifugal force exerted on the weighted frame varies as a function of the square of the rotational speed of said driving member with equal variations in the angular position of the weighted frame, whereby said frame moves through uniform angular distances with uniform variations in the rotational speed of said driving member, a plunger movable along the axis of rotation of said driving member, means connected to said weighted frame and actuated thereby for actuating said plunger, a rockshaft, means for actuating said rockshaft by the longitudinal movement of said plunger, indicating means, and transmission means connecting said rockshaft to said indicating means for actuating the latter.

JAMES E. BEVINS.